United States Patent
Litteaur et al.

(10) Patent No.: US 12,209,707 B2
(45) Date of Patent: Jan. 28, 2025

(54) DOUBLE SEALED PRESSURE CONTAINMENT ASSEMBLY

(71) Applicant: Daily Instruments, Houston, TX (US)

(72) Inventors: Raymond B. Litteaur, Houston, TX (US); Ethann Meister, Houston, TX (US); Ian Savaya, Houston, TX (US)

(73) Assignee: Daily Instruments, Houston, TX (US)

( * ) Notice: Subject to any disclaimer, the term of this patent is extended or adjusted under 35 U.S.C. 154(b) by 0 days.

(21) Appl. No.: 18/258,749

(22) PCT Filed: Mar. 25, 2022

(86) PCT No.: PCT/US2022/021919
§ 371 (c)(1),
(2) Date: Jun. 21, 2023

(87) PCT Pub. No.: WO2023/069132
PCT Pub. Date: Apr. 27, 2023

(65) Prior Publication Data
US 2024/0035624 A1    Feb. 1, 2024

Related U.S. Application Data

(60) Provisional application No. 63/256,868, filed on Oct. 18, 2021.

(51) Int. Cl.
*F17C 13/06* (2006.01)
*F17C 13/02* (2006.01)

(52) U.S. Cl.
CPC ............ *F17C 13/06* (2013.01); *F17C 13/025* (2013.01); *F17C 13/026* (2013.01);
(Continued)

(58) Field of Classification Search
CPC ...... F17C 13/06; F17C 13/025; F17C 13/026; F17C 2201/0109; F17C 2201/032
(Continued)

(56) References Cited

U.S. PATENT DOCUMENTS 4,848,927 A * 7/1989 Daily ..................... G01K 1/14
374/208
4,978,832 A * 12/1990 Rubin ................... F17C 13/026
392/453
(Continued)

FOREIGN PATENT DOCUMENTS

| CN | 103528705 A | 4/2014 |
| RU | 2646430 C1 | 3/2018 |

OTHER PUBLICATIONS

International Search Report and Written Opinion issued on Jul. 12, 2022 for corresponding PCT Application No. PCT/US22/21919.
(Continued)

*Primary Examiner* — J. Gregory Pickett
*Assistant Examiner* — Niki M Eloshway
(74) *Attorney, Agent, or Firm* — Diana M. Sangalli; Duane Morris LLP (57) ABSTRACT

A pressure containment assembly for use with a plurality of sensor assemblies for monitoring a parameter within a pressure vessel is disclosed. The pressure containment assembly includes a primary seal plate to seal against pressure in the pressure vessel and a plurality of passageways to receive the sensor assemblies. The containment assembly also includes a secondary seal cap connected to the process plate and covering the passageways. The seal cap includes a recessed region that is oriented such that, when the seal cap is sealed to the primary seal plate, the recessed region creates a sealed pressure containment chamber.

20 Claims, 4 Drawing Sheets

(52) U.S. Cl.
CPC ..... *F17C 2201/0109* (2013.01); *F17C 2201/032* (2013.01); *F17C 2250/0439* (2013.01); *F17C 2250/0491* (2013.01); *F17C 2260/038* (2013.01); *F17C 2270/05* (2013.01)

(58) Field of Classification Search
USPC ........................................................ 220/581
See application file for complete search history.

(56) References Cited

U.S. PATENT DOCUMENTS

| | | | |
|---|---|---|---|
| 6,053,632 | A | 4/2000 | Leininger |
| 6,543,303 | B1 | 4/2003 | Hilborn et al. |
| 2012/0261004 | A1 | 10/2012 | Pietroni |
| 2015/0240814 | A1* | 8/2015 | Snyder ............... F17C 13/08 |
| | | | 137/565.17 |
| 2017/0030342 | A1* | 2/2017 | Brown ............... F04B 15/08 |
| 2020/0309585 | A1 | 10/2020 | Salvo et al. |
| 2022/0334002 | A1* | 10/2022 | Litteaur ............. G01K 7/06 |

OTHER PUBLICATIONS

International Preliminary Report on Patentability and Written Opinion issued on Apr. 23, 2024 for corresponding PCT Application No. PCT/US22/021919.

* cited by examiner

DOUBLE SEALED PRESSURE CONTAINMENT ASSEMBLY

CROSS-REFERENCE TO RELATED APPLICATION

This application is a national phase entry under 35 U.S.C. § 371 of international patent application no. PCT/US22/21919, filed Mar. 25, 2022, which claims priority to U.S. Provisional Patent Application No. 63/256,868, filed on Oct. 18, 2021, the entireties of which are incorporated herein by reference.

FIELD

The present disclosure relates generally to a pressure containment assembly, and, more particularly, to a double sealed pressure containment assembly that provides for sealed penetration of sensors into a high pressure vessel, such as a reactor vessel used in the petrochemical and refining industry.

BACKGROUND

The petrochemical and refining industries generally employ various processes where parameters, such as temperature, must be measured reliably and accurately. Many of these processes involve treatment of a hydrocarbon material using various catalytic processes that are carried out in a reactor vessel. Typically, such processes involve reacting the hydrocarbon material with hydrogen in a series of catalyst beds, each of which is made up of a material that is suited for the type of hydroprocess performed in the particular bed. These processes are performed at high pressures and high temperatures, which must be monitored and controlled to ensure that the process is carried out efficiently, but safely, without damaging either the vessel or the materials that make up the catalyst beds.

A variety of temperature sensors have been used in conjunction with these processes. For example, sensors can be deployed in a catalyst bed to monitor the temperature of the catalyst for the purpose of maintaining control of the temperature of the process, maximizing the use of the catalyst and/or projecting the remaining useful life of the catalyst. Other sensors may be deployed to monitor the temperature of the inner surface of the wall that defines the vessel. To perform these functions, the sensors must be introduced into the vessel using an assembly that allows the sensors to penetrate the vessel's wall but that prevents escape of the pressure or gas from the process.

Such sensors typically are thermocouples, where the sensing point of the thermocouple is contained within a protective sheath that is inserted within the vessel and the free ends of the thermocouple exit the sheath exterior of the vessel for connection to an instrument junction box that contains electronics for providing a signal indicative of the measured temperature. In applications, a single sheath can contain one or multiple thermocouples to form a sensor assembly. Further, multiple sensor assemblies can be inserted into the vessel to monitor the process therein. For operational and safety reasons, a double-sealed pressure containment chamber is provided at the location where the sensor assemblies penetrate the wall of the vessel. Pressure within the containment chamber is monitored to detect breach of a seal that allow gas from the process to escape the vessel.

BRIEF DESCRIPTION OF THE DRAWINGS

Certain embodiments of the invention will hereafter be described with reference to the accompanying drawings, wherein like reference numerals denote like elements. It should be understood, however, that the accompanying drawings illustrate only the various implementations described herein and are not meant to limit the scope of various technologies described herein. The drawings are as follows.

DETAILED DESCRIPTION

Double sealed pressure-retaining containment assemblies are often used in conjunction with pressure vessels to allow various devices, such as sensors, to penetrate the vessel so that the device is partially inside and partially outside of the vessel without letting pressure or gases within the vessel to escape. In applications involving high temperature, high pressure, corrosive processes, redundant pressure seals typically are required. In general, the redundant pressure seals include a primary seal that is exposed to the process in the vessel and a secondary seal that is not exposed to the process. Together, the primary seal and secondary seal define a sealed secondary pressure containment chamber. If the primary seal is breached, the containment chamber will fill with process gas. A pressure gauge or temperature that monitors the containment chamber will then indicate to a user that the seal assembly should be replaced or repaired when the opportunity arises. One such prior art sealed containment assembly is show in FIGS. 1 and 2.

Figure 1:
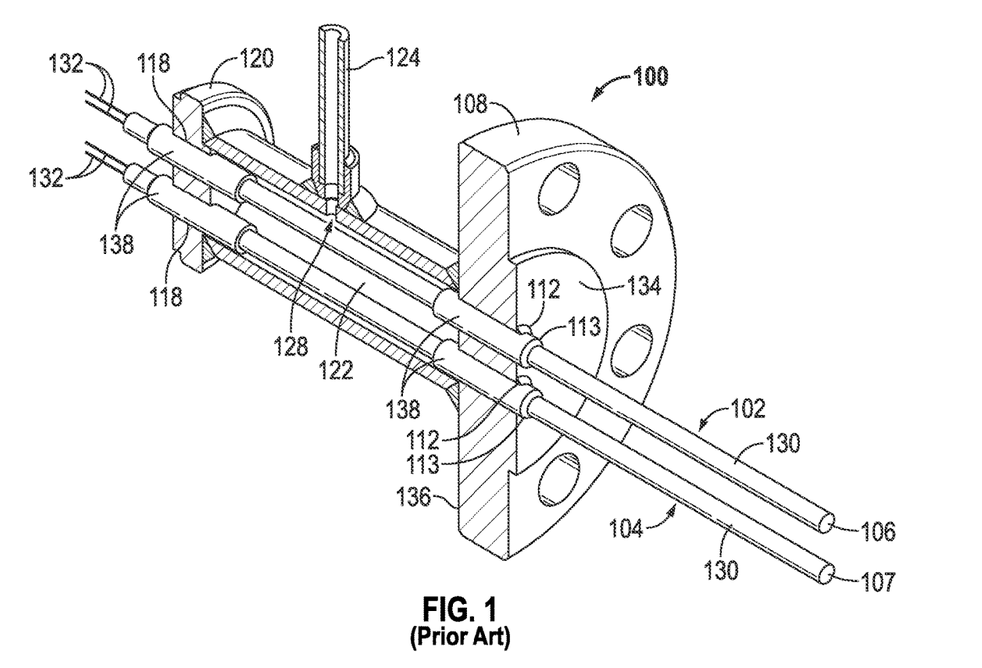
FIG. 1 is a perspective illustration of a prior art double seal containment assembly used with sensor assemblies.

FIG. 1 is a perspective view of a prior art sealed containment assembly 100 that allows two sensor assemblies 102 and 104 to penetrate a process vessel. In use, ends 106 and 107 of sensor assemblies 102 and 104 extend through a process connection flange 108 and through an entry opening in the wall of a process vessel so that the sensor assemblies 102, 104 can monitor parameters of the process occurring within the vessel, such as temperature. On the process side of the flange 108, sensor passageways 110 are sealed by welds 112, 113 which serve as the primary seal. Opposing ends 114 and 116 of the sensor assemblies 102, 104 exit the double seal chamber assembly 100 through passageways 118 bored through a seal cap 120 so that the sensor assemblies 102, 104 can be connected to instrumentation 126 that includes appropriate connections and electronics to provide signals indicative of the sensed parameters.

A secondary containment chamber 122 is defined at one end by the process flange 108 and at the other end by the seal cap 120. A pressure bleed valve 124 is in communication with the chamber 122 through an outlet 128. In the event the primary seal 112, 113 is breached, pressure will rise in the chamber 122 and escape through the bleed valve 124. A pressure gauge or other pressure indicator 130 can be connected to the valve 124 to provide a signal or warning indicative of breach of the primary seal 112, 113.

Figure 2:
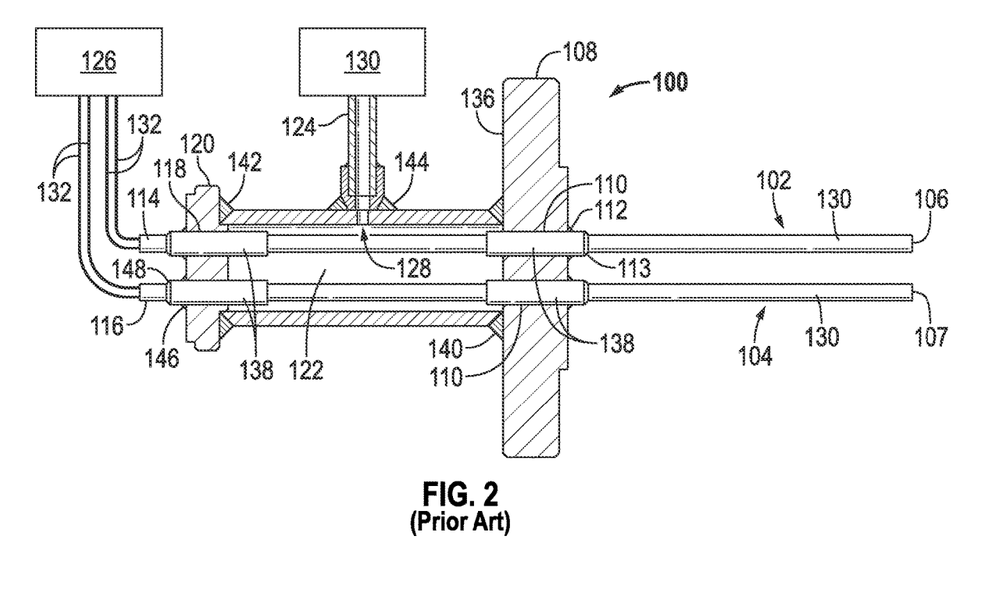
FIG. 2 a cross-sectional and schematic illustration of the prior art assembly of FIG. 1.

FIG. 2 is a cross-sectional view of the prior art containment assembly 100 of FIG. 1. In the example embodiment of FIGS. 1 and 2, sensor assemblies 102, 104 are temperature sensors configured as thermocouples that are contained with a sheath 130 made of a conductive material. Each sheath 130 can include one or more thermocouples, where each thermocouple is made of two dissimilar conductors that are joined to form a sensing point. In use, the sensing points of the thermocouples 102, 104 are positioned within the interior of the process vessel. Free ends 132 of the dissimilar conductors that make up the thermocouples 102, 104 exit the sheaths 130 exterior of the vessel for connection to measurement instrumentation 126.

The double seal containment assembly 100 is configured to sealingly close an opening into a pressure vessel through which the sensor assemblies 102, 104 are passed so that the sensor assemblies 102, 104 are at least partially positioned and sealed within the interior of the vessel. To that end, the assembly 100 includes the process connection flange 108 that is configured to attach to the vessel at the entry opening, such as by connection to a complementary flange or nozzle. As shown in FIG. 2, the process connection flange 108 includes passageways 110 through which the sensor assemblies 102, 104 pass and then enter the vessel through the opening. A face 134 of the flange 108 is exposed to the process within the vessel, which can be a high temperature, high pressure, corrosive process. The opposing face 136 of the flange 108 is not exposed to the process.

To seal the opening into the vessel, the sensor assemblies 102, 104 are sealed to the process-facing face 134 of the flange 108 at the exits of the passageways 110 such as by welding seals 112, to form the primary seal. In embodiments, the sheaths 130 of the sensor assemblies 102, 104 can be directly welded to the face 134 of the flange 108. Or, weld sleeves 138 can be disposed about the sheaths 130 to assist with the welds. In such embodiments, weld seals 112 are formed between the weld sleeves 138 and the flange 108 and welds 113 are formed between the weld sleeves 138 and the sensor sheaths 130 such that together welds 112, 113 form the primary seal.

The secondary seal for the double seal assembly 100 includes the containment chamber 122 that is sealed between the flange 108 and the cap 120. In the embodiment shown, the chamber 122 is made of pipe having an inside diameter that is sized to fit the number of sensors assemblies (two sensor assemblies, in this embodiment) that will be inserted into the vessel. In applications in which a large number of sensor assemblies is used, the inner diameter of the pipe that forms the containment chamber 122 (and hence the internal volume of the chamber 122) must be increased in a corresponding manner and thus can be quite sizeable. The chamber 122 is sealed to the non-process-face 136 of the flange 108 by welding to form a weld 140. The chamber 122 is sealed to the cap 120 by welding to form a weld 142. The chamber 122 is sealed to the bleed valve 124 by welding to form a weld 144. Each of welds 140, 142, 144 is a full penetration weld in order to ensure that the containment chamber 122 can withstand high internal pressures. As shown, the cap 120 includes two passageways 118 through which the sensor assemblies 102, 104 exit the double seal assembly 100. The secondary seal is completed by forming welds 146 directly between the sheaths 130 of the sensors 102, 104 and the cap 120. Or, weld sleeves 138 and welds 146, 148 can be formed.

From the foregoing description, it can be seen that the prior art double seal containment assembly 100 shown in FIGS. 1 and 2 can be bulky and thus not only can often get in an operator's way, but also requires a large space for installation. In addition, the inner diameter of the containment chamber 122 can be quite large when numerous sensor assemblies are used. As such, if the primary seal is breached, the chamber 122 may contain a large volume of high pressure gas, which can be a safety concern. Yet further, the secondary seal is formed of a large number of welds, which introduces multiple failure opportunities. All welds must be inspected, particularly the full penetration welds 130, 142, 144, which is costly and time-consuming. Still further, the primary seal welds 112, 113 are exposed to the high temperature process in the vessel, while the secondary seal components are not. This creates a temperature differential that stresses the primary and secondary seal welds due to thermal expansion, which increases the risk of seal breach or failure.

Accordingly, embodiments of the invention provide a double pressure seal containment assembly that allows for introduction of a sensor assembly at least partially into the interior of a high pressure vessel. The pressure seal assembly includes a primary seal plate with one or more passageways through which one or more sensor assemblies can be inserted and introduced into the interior of the vessel. The primary seal plate can be a process connection flange that attaches to the vessel at the entry opening, such as by coupling to a complementary flange or nozzle using bolts. The assembly also includes a secondary seal that includes a secondary plate or cap that is configured for sealing connection to the primary seal plate so that a sealed containment chamber is formed therebetween. The secondary plate or cap includes one or more passageways through which the one of more sensor assemblies exit so that the free ends of the sensors can be coupled to instrumentation that is located exterior of the vessel. In embodiments, the secondary plate is configured as a cap having a cavity or recessed region oriented such that the cavity creates the sealed secondary containment chamber when the cap is sealed to the primary seal plate. For example, the recessed region can be formed as a bore having a peripheral lip or wall extending outwardly from a face of the cap that faces the non-process face of the primary seal plate. When the peripheral lip of the secondary plate is sealed to the non-process face of the primary seal plate, a sealed gap is formed therebetween. This sealed gap serves as the secondary containment chamber. Pressure is monitored within the secondary containment chamber to detect failure or leakage of the primary seal.

In this manner, a double seal pressure containment assembly is provided that has a smaller footprint so that it can be installed in applications with limited space. In addition, the smaller footprint reduces the temperature differential between the primary and secondary seals, thus decreasing the risk of failure due to thermal expansions. Moreover, fewer welds are needed and full penetration welds can be eliminated. The volume of the containment chamber is substantially reduced, thus decreasing safety concerns. And, the double seal containment assembly is easier to manufacture and repair than currently known assemblies, such as the prior art assembly of FIGS. 1 and 2.

Figure 3:
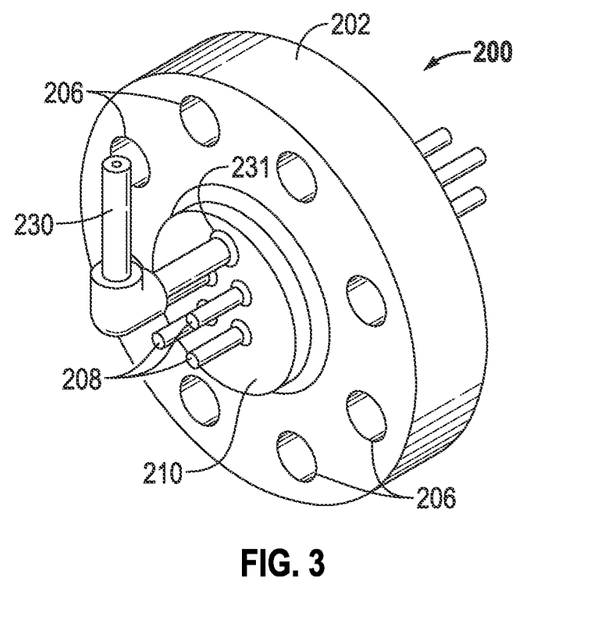
FIG. 3 is a perspective illustration of a double sealed pressure containment assembly used with sensor assemblies, according to an embodiment.
Figure 4:
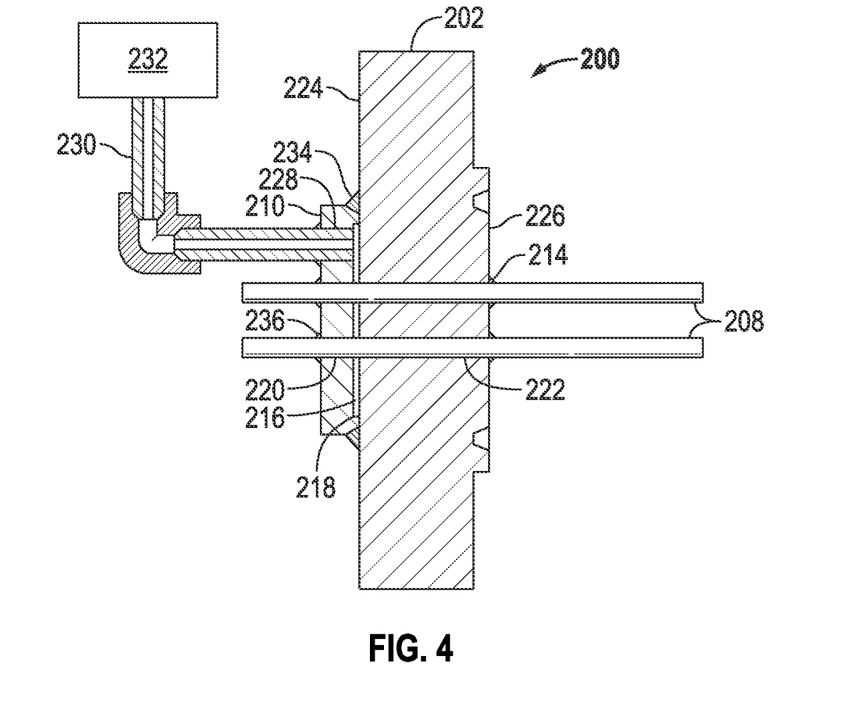
FIG. 4 is a cross-section and schematic illustration of the assembly of FIG. 3, according to an embodiment.

Turning now to FIGS. 3 and 4, an example of a double seal pressure containment assembly 200 is shown, according to an embodiment. Assembly 200 includes a primary seal plate 202, which can be a process connection flange that is configured to connect to a process vessel 204 (see FIG. 8) to cover an opening into the vessel 204 through which sensor assemblies can be introduced. The plate 202 can be connected to the vessel 204 by connection to a complementary flange or nozzle. For example, the plate 202 can include a plurality of bolt holes 206 extending through the plate 202 for receiving bolts or other appropriate fasteners for connection with a complementary flange having a complementary set of holes.

In the embodiment shown, the assembly 200 is configured for use with four sensor assemblies 208. However, it should be understood that the assembly 200 can be configured for use with any number of sensor assemblies, including only a single assembly or more than four assemblies. Further, the sensor assemblies 208 can include any type of sensor suitable for monitoring a desired parameter within the interior of the vessel. For example, the sensor assemblies 208 can include one or more thermocouples for monitoring temperatures. However, it should be understood that any type of sensor can be employed and is contemplated within the scope of this disclosure.

Figures 5, 6, 7:
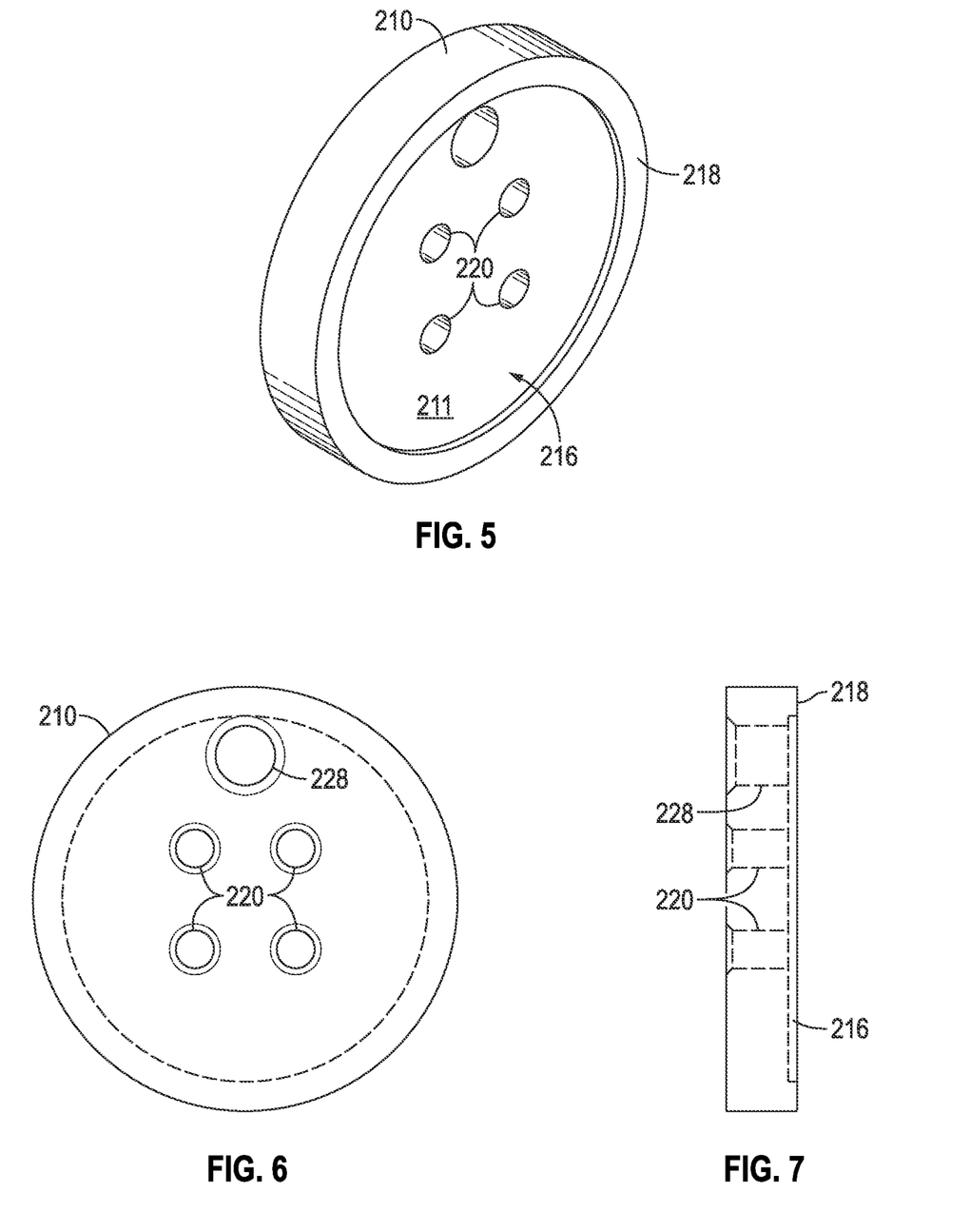
FIG. 5 is a perspective view of a seal cap that is part of the double seal containment assembly of FIG. 3, according to an embodiment.
FIG. 6 is a bottom plan view of the seal cap of FIG. 5, according to an embodiment.
FIG. 7 is a side elevation view of the seal cap of FIG. 5, according to an embodiment.

The assembly 200 also includes a seal cap 210 that is sealingly connected to a first face 224 of the plate 202, such as by a seal weld 214 or other type of sealing connection. An example of seal cap 210 is shown in FIGS. 5, 6 and 7, according to an embodiment. FIG. 5 is a perspective view of the example of seal cap 210; FIG. 6 is a bottom plan view of the cap 210 of FIG. 5; and FIG. 7 is a side elevation of the cap 210 of FIG. 5. In this example, a cavity or recessed region 216 is formed in an interior face 211 of the cap 210 and is surrounded by an outwardly extending lip or wall 218. In embodiments, the cavity 216 can be formed by boring or milling an inner diameter of the interior face 211 of the cap 210 to a desired depth, leaving the peripheral lip or wall 218. However, it should be understood that the cavity or recessing region 216 can be formed in other manners, such as by a casting process. The cavity 216 serves as a secondary containment chamber when the lip 218 of the cap 210 is sealed to the plate 202.

The outer diameter of the cap 210 generally will be selected so that it is compatible with the process plate 202, which, in turn, is sized to be compatible with a connection flange that provides for connection of plate 202 to a pressure vessel. In embodiments, the overall thickness of the cap 210 is approximately 1 inch, and the outer diameter of the cap 210 can be in the range of approximately 3 to 8 inches, such as 6 inches as an example. The inner diameter of the cap 210 that is defined by the peripheral lip 218 is sized so that all passageways 220 are located within, or surrounded by, the periphery of the lip 218, while also ensuring that the lip 218 has a sufficient thickness to withstand the pressures that may be encountered in the particular application in which assembly 200 is deployed. For example, in the embodiment shown in FIGS. 5-7, the outer diameter of cap 210 is approximately 6 inches and the inner diameter defined by lip 218 is approximately 5 inches. The depth of cavity 216 is generally selected to be a small as possible provided that a gap remains between the interior face 211 of the cap 210 and the face 224 of the plate 202 when the components of assembly 200 are assembled. For example, the depth of the cavity 216 can be approximately ⅛ inch to ensure that no deformities in either the cap 210 or the plate 202 close the gap. It should be understood, however, that the various dimensions of the cap 210 can be larger or smaller than the dimensions described above as may be appropriate for the specific application in which the assembly 200 is deployed.

The cap 210 also includes passageways 220 that extend from an outer face of the cap 210 and through the interior face of the cap 210 for receiving each of the sensor assemblies 208. The process plate 202 also includes corresponding passageways 222 for the sensor 208 that extend from a first face 224 of the plate 202 through a second face 226 of the plate 202. The second face 226 of the plate 202 is exposed to the process in the vessel, while the first face 224 is not.

The cap 210 also includes an outlet 228 that extends through the cap 210 and opens into the cavity 216. The outlet 228 thus provides for fluid communication with the containment chamber 216 that is formed when the cap 210 is sealed to the plate 202. A tubing or pipe 230 can be coupled with the outlet 228 so that pressure within the containment chamber 216 can be monitored. For example, a pressure sensor or other pressure indicator 232 can be coupled to the tubing 230 to provide an indication of pressure. If a pressure increase within the chamber 216 is detected, the pressure sensor 232 can be configured to generate a signal or warning to indicate that the primary seal has been breached and a repair should be made.

FIG. 4 provides a cross-sectional view of the assembly 200 shown in FIG. 3. As shown in FIG. 4, the sensor assemblies 208 are sealed by welds 214 to the process-facing face 226 of the plate 202 at the exits of the passageways 222, thus forming the primary seal. In FIG. 4, the welds 214 are made directly between the sensor sheath and the face 226 of the plate 202. However, weld sleeves also can be used to facilitate the sealing connection. The cap 210 is sealingly connected to the non-process facing face 224 of the plate 202 by a sealing weld 234. In embodiments, the weld 234 can be a fillet weld or a full penetration weld. The lip 218 of the cap 210 separates the inner face of the cap 210 from the face 224 of the plate 202, thus forming the sealed secondary containment chamber 216. The sensor assemblies 208 exit the sealed chamber assembly 200 through passageways 220 which are sealed with welds 236. Again, in embodiments, weld sleeves can be used to facilitate the sealing of the passageways 220. A tubing assembly 230 is in fluid communication with the sealed containment chamber 216 through the outlet 228 and is sealed to the seal plate 218, such as by a seal weld 231. In embodiments, tubing assembly 230 can be one or more sections of tubing or pipe. For example, tubing assembly 230 can be multiple sections of tubing or pipe interconnected with a joining piece, such as an elbow joint. As another example, tubing assembly 230 can be a single section of tubing or pipe that is either straight or bent to a desired angle. The tubing assembly 230 can be coupled to a pressure sensor 232 that is configured to provide an indication of a pressure increase and, thus, a breach of the primary seal that is allowing gas from the process to leak into the chamber 216.

Figure 8:
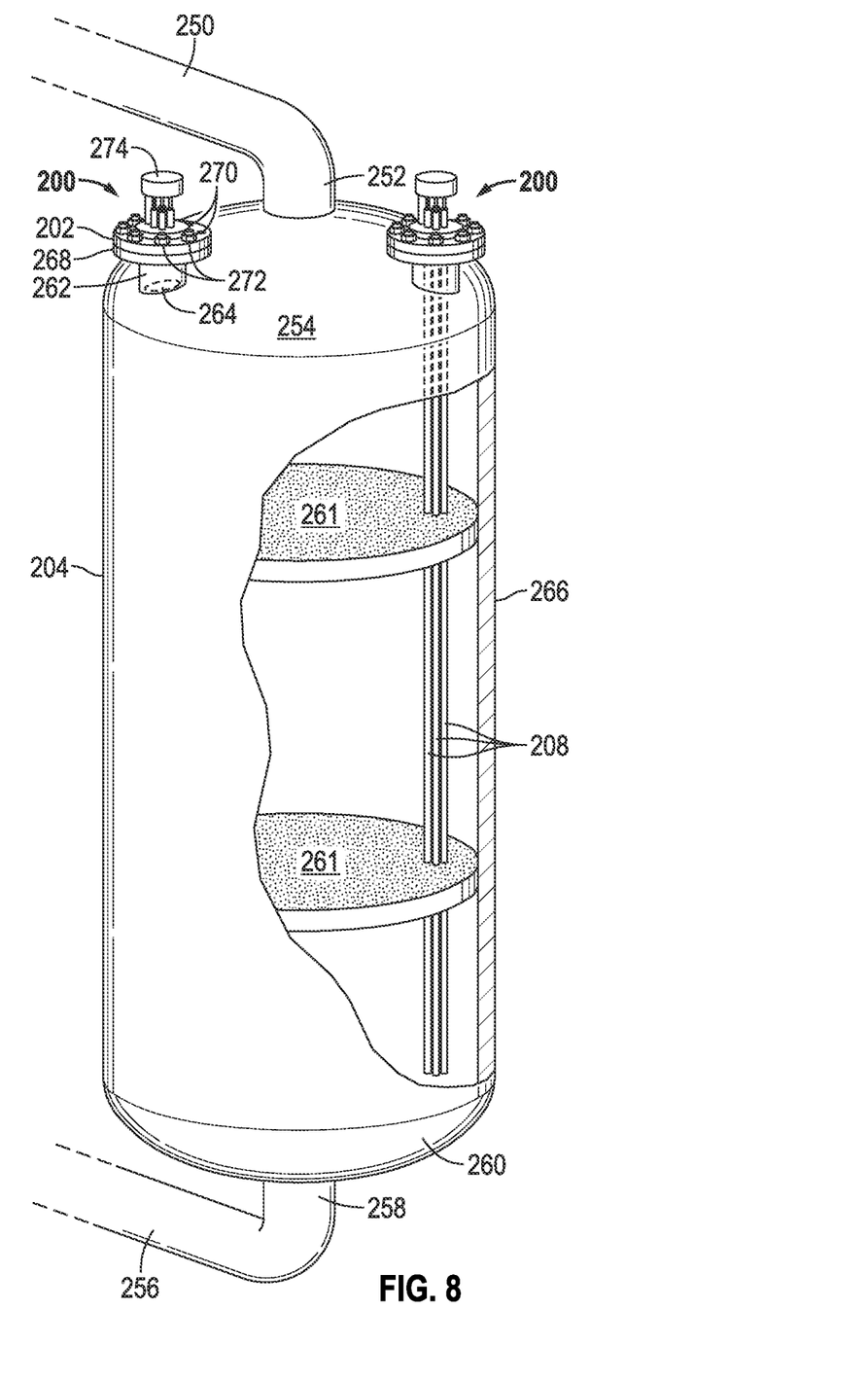
FIG. 8 illustrates a high pressure reaction vessel combined with a double sealed pressure containment assembly and sensor assemblies, according to an embodiment.

Referring generally to FIG. 8, a specific application of the double seal containment assembly 200 and sensor assemblies 208 is illustrated. In this embodiment, a high pressure chemical reaction vessel 204 is designed for a desired chemical process. For example, high pressure vessel 204 can be used in the petroleum industry and can comprise a hydrocracker, a hydrotreater, a hydrogen reactor, a catalytic reactor, a catalytic cracker or an ethylene oxide reactor. Vessel 204 also can be used with weld pad or tube skin applications. In an exemplary application, one or more high pressure chemical reaction vessels are coupled to a manifold pipe 250 by a connector pipe 252. Connector pipe 252 is disposed in fluid communication with the interior of vessel 204 generally at an upper portion 254 of vessel 204. Similarly, a second manifold pipe 256 is coupled to the one or more vessels 204 by an appropriate lower connector pipe 258. Lower connector pipe 258 generally is connected in fluid communication with vessel 204 at a lower or bottom portion 260. Manifold pipe 250 and second manifold pipe 256 can be used to provide ingress or egress of fluids moving to or from high pressure chemical reaction vessel or vessels 204.

In a petrochemical application, petrochemicals move into high pressure chemical reaction vessels 204 in either direction depending on the specific application. For example, flow can be from manifold pipe 250 downward through vessel 204 and out through second manifold pipe 256. Alternatively, the flow can be in the reverse direction moving from second manifold pipe 256 upwardly through vessel 204 to manifold pipe 250.

Typically, one or more catalyst beds 261 are deployed within high pressure chemical reaction vessel 204 at various levels. The number and type of beds vary according to the environment and the types of high pressure and high temperature reactions that take place within the reactor, e.g., high pressure chemical reaction vessel 204, for a given application. To sense the reaction temperature at different levels and to control the proper reaction rate, temperature is sensed at various selected levels within vessel 204.

One or more sensor assemblies 208 are deployed to extend downwardly into the interior of vessel 204 and positioned for sensing temperature at a plurality of locations within the vessel. It should be noted that one or more sensor assemblies also can be deployed from the side (e.g., horizontally) and/or from the bottom of vessel 204. The sensor assemblies 208 can be positioned to monitor temperature at any of a variety of locations, including within the catalyst beds 261 or proximate the inner surface of the wall of the vessel 204.

Depending on the application and type of vessel 204 used in the application, the attachment of the pressure containment assembly with the sensor assemblies can vary. One exemplary embodiment uses a neck or nozzle 262 fastened to vessel 204 by, for example, a weldment. Nozzle 262 is deployed around an opening 264 formed through the outer wall 266 of the vessel 204. A flange 268 is connected to an upper end of nozzle 262 to facilitate mounting of the sensor assemblies 208 and pressure containment assembly 200. Flange 268 typically is welded to nozzle 262. If additional sensor/pressure containment assemblies are used for a given application, a plurality of nozzles and flanges can be connected to the vessel as described.

Flange 268 can include a plurality of holes 270 configured for alignment with holes 206 of process plate 202. Appropriate fasteners 272, such as bolts, can be inserted through apertures 206 and 270 to secure the assembly 200 to the vessel 204. Appropriate seals can be used intermediate flange 268 and process plate 202 to prevent escape of high pressure fluids, depending on a particular application. As shown in FIG. 5, the sensor assemblies 208 also are connected to a junction box 274 for connection to an electronic instrumentation system.

As is evident from the foregoing description, the pressure containment assembly described herein utilizes fewer parts than currently known containment systems. The assembly 200 has a small footprint and can be readily installed in a limited space. In addition, the small footprint results in a reduced temperature differential and thus decreases thermal stresses on the primary and second seals. While full penetration welds can be used, they are not required to seal the containment chamber, thus facilitating inspection and testing. The internal volume of the containment chamber 216 also is substantially reduced, thus easing safety concerns when the primary seal is breached. Yet further, the assembly can be more easily repaired than known assemblies. For example, if a sensor assembly 208 fails, a simple drill that passes through both the seal cap 210 and the process plate 202 can be used to remove the assembly.

While the invention has been disclosed with respect to a limited number of embodiments, those skilled in the art, having the benefit of this disclosure, will appreciate numerous modifications and variations therefrom. For example, the materials used in forming the double sealed containment assembly and the sensor assemblies can be adjusted according to changes in sensor design, advancement of material science, the environment of use, etc. Additionally, the containment assembly can be used in a variety of application that may require various mounting structure, support structures and instrumentation. It is intended that the appended claims cover such modifications and variations as fall within the true spirit and scope of the invention.

What is claimed is:

1. A pressure containment assembly for use with a plurality of sensor assemblies, the pressure containment assembly comprising:
   a primary seal plate to retain pressure in a pressure vessel, the primary seal plate having a plurality of first passageways to receive a plurality of sensor assemblies for insertion into the pressure vessel to monitor a parameter therein; and
   a secondary seal cap connected to the primary seal plate and covering the plurality of first passageways, the seal cap having a recessed region oriented such that, when the seal cap is sealed to the primary seal plate, the recessed region creates a sealed pressure containment chamber through which the plurality of sensor assemblies extend for receipt by the plurality of first passageways and insertion into the pressure vessel,
   wherein the secondary seal cap includes an outlet for fluid communication with the sealed pressure containment chamber.

2. The pressure containment assembly as recited in claim 1, wherein the secondary seal cap includes a plurality of second passageways to receive the plurality of sensor assemblies, the plurality of second passageways opening into the recessed region.

3. The pressure containment assembly as recited in claim 1, wherein the recessed region comprises a bore.

4. The pressure containment assembly as recited in claim 1, wherein the secondary seal cap is sealed to the primary seal plate by welding.

5. The pressure containment assembly as recited in claim 1, wherein the primary seal plate comprises a flange to connect with a complementary flange around an opening into the vessel.

6. A pressure vessel assembly, comprising:
   a pressure vessel in which a process is carried out;
   a plurality of sensor assemblies to monitor one or more parameters associated with the process carried out in the pressure vessel, the pressure vessel having an opening through which the plurality of sensor assemblies are inserted into the pressure vessel;
   a primary seal plate to cover the opening and retain pressure in the pressure vessel, the primary seal plate having a plurality of first passageways to receive the plurality of sensor assemblies, the first passageways extending through a first face of the primary seal plate that is not exposed to the process in the pressure vessel and through a second face of the primary seal plate that is exposed to the process in the pressure vessel; and a secondary seal cap connected to the primary seal plate and covering the plurality of first passageways, the secondary seal cap having a cavity oriented such that, when the secondary seal cap is sealed to the first face of the primary seal plate, the cavity forms a sealed pressure containment chamber, wherein the plurality of sensor assemblies extend through the secondary seal cap including through the cavity, wherein the secondary seal cap is welded to the first face of the primary seal plate.

7. The pressure vessel assembly as recited in claim 6, wherein the cavity comprises a bore.

8. The pressure vessel assembly as recited in claim 6, wherein the secondary seal cap includes a plurality of second passageways, the plurality of sensor assemblies extending through the plurality of second passageways and into the cavity.

9. The pressure vessel assembly as recited in claim 6, wherein the secondary seal cap includes an outlet to provide for fluid communication with the sealed pressure containment chamber so that an indication of pressure within the sealed pressure containment chamber can be provided.

10. The pressure vessel assembly as recited in claim 9, further comprising a pressure sensor coupled with the outlet.

11. The pressure vessel assembly as recited in claim 6, wherein the sensor assemblies are configured to monitor temperature within the pressure vessel.

12. The pressure vessel assembly as recited in claim 6, wherein each of the plurality of first passageways are sealed at the second face of the primary seal plate by respective welds.

13. The pressure vessel assembly as recited in claim 6, wherein the primary seal plate comprises a flange connected with a complementary flange around the opening into the vessel.

14. A method of monitoring a parameter of interest of a process carried out in a pressure vessel, the method comprising:
    connecting a pressure containment assembly to a pressure vessel to seal an opening into the pressure vessel, the pressure containment assembly comprising:
        a primary seal plate having a plurality of first passageways to receive a plurality of sensor assemblies introduced into the pressure vessel through the opening; and
        a secondary seal cap sealed to the primary seal plate, the secondary seal cap having a recessed region that is oriented such that, when the secondary seal cap is sealed to the primary seal plate, the recessed region creates a pressure containment chamber, the plurality of sensor assemblies extending through the secondary seal cap including through the pressure containment chamber, wherein the secondary seal cap further includes an outlet in fluid communication with the sealed containment chamber;
    positioning the sensor assemblies within the pressure vessel to monitor one or more parameters of interest; and
    monitoring pressure within the sealed containment chamber through the outlet while the process is carried out in the pressure vessel.

15. The method as recited in claim 14, wherein the one or more parameters of interest include temperature.

16. The method as recited in claim 14, wherein the first passageways extending through a first face of the primary seal plate that is not exposed to the process in the pressure vessel and through a second face of the primary seal plate that is exposed to the process in the pressure vessel, the method further comprising sealing the first passageways about the plurality of sensor assemblies at the second face of the primary seal plate.

17. The method as recited in claim 16, wherein the secondary seal cap an outer face and an inner face through which a plurality of second passageways extend and open into the recessed region, the sensor assemblies received by the second passageways, the method further comprising sealing the second passageways about the plurality of sensor assemblies at the outer face of the secondary seal cap.

18. A pressure containment assembly for use with a plurality of sensor assemblies, the pressure containment assembly comprising:
    a primary seal plate to retain pressure in a pressure vessel, the primary seal plate having a plurality of first passageways to receive a plurality of sensor assemblies for insertion into the pressure vessel to monitor a parameter therein; and
    a secondary seal cap connected to the primary seal plate and covering the plurality of first passageways, the seal cap having a recessed region oriented such that, when the seal cap is sealed to the primary seal plate, the recessed region creates a sealed pressure containment chamber through which the plurality of sensor assemblies extend for receipt by the plurality of first passageways and insertion into the pressure vessel,
    wherein the secondary seal cap is sealed to the primary seal plate by welding.

19. A pressure vessel assembly, comprising:
    a pressure vessel in which a process is carried out;
    a plurality of sensor assemblies to monitor one or more parameters associated with the process carried out in the pressure vessel, the pressure vessel having an opening through which the plurality of sensor assemblies are inserted into the pressure vessel;
    a primary seal plate to cover the opening and retain pressure in the pressure vessel, the primary seal plate having a plurality of first passageways to receive the plurality of sensor assemblies, the first passageways extending through a first face of the primary seal plate that is not exposed to the process in the pressure vessel and through a second face of the primary seal plate that is exposed to the process in the pressure vessel; and
    a secondary seal cap connected to the primary seal plate and covering the plurality of first passageways, the secondary seal cap having a cavity oriented such that, when the secondary seal cap is sealed to the first face of the primary seal plate, the cavity forms a sealed pressure containment chamber, wherein the plurality of sensor assemblies extend through the secondary seal cap including through the cavity,
    wherein the secondary seal cap includes an outlet to provide for fluid communication with the sealed pressure containment chamber so that an indication of pressure within the sealed pressure containment chamber can be provided.

20. The pressure vessel assembly as recited in claim 19, further comprising a pressure sensor coupled with the outlet.

* * * * *